July 8, 1952  H. C. FLINT  2,602,487
SPRING SEAT AND BACK
Filed July 6, 1946  3 Sheets-Sheet 1

INVENTOR:
Hyland C. Flint
BY Thiess Olson &
Mechlenburger
ATTYS:

July 8, 1952  H. C. FLINT  2,602,487
SPRING SEAT AND BACK
Filed July 6, 1946  3 Sheets-Sheet 2
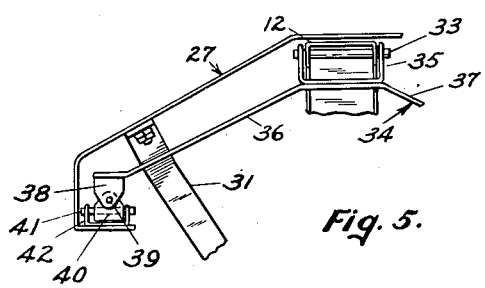
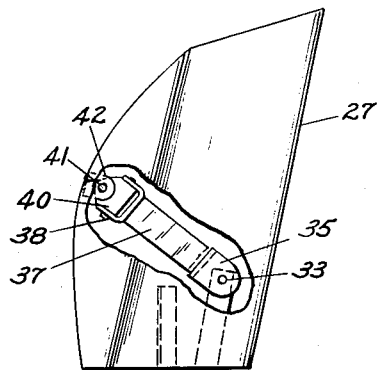
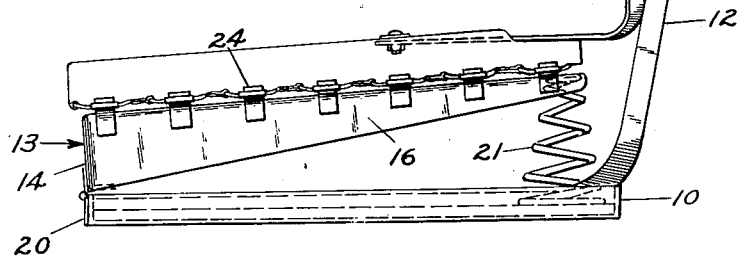
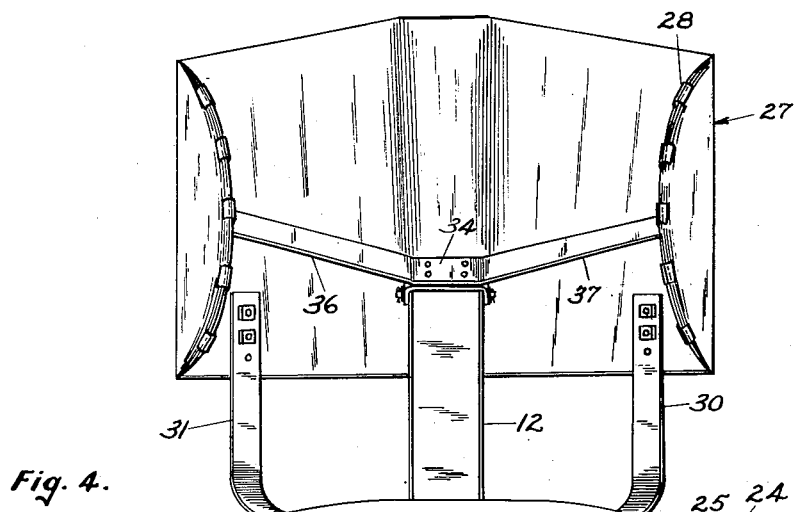
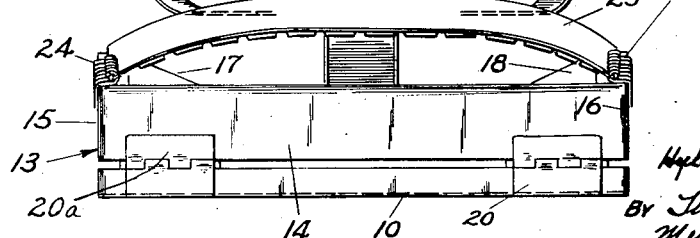
INVENTOR:
Hyland C. Flint
BY Thiess Olson &
Mecklenburger
ATTYS:

July 8, 1952 H. C. FLINT 2,602,487
SPRING SEAT AND BACK
Filed July 6, 1946 3 Sheets-Sheet 3
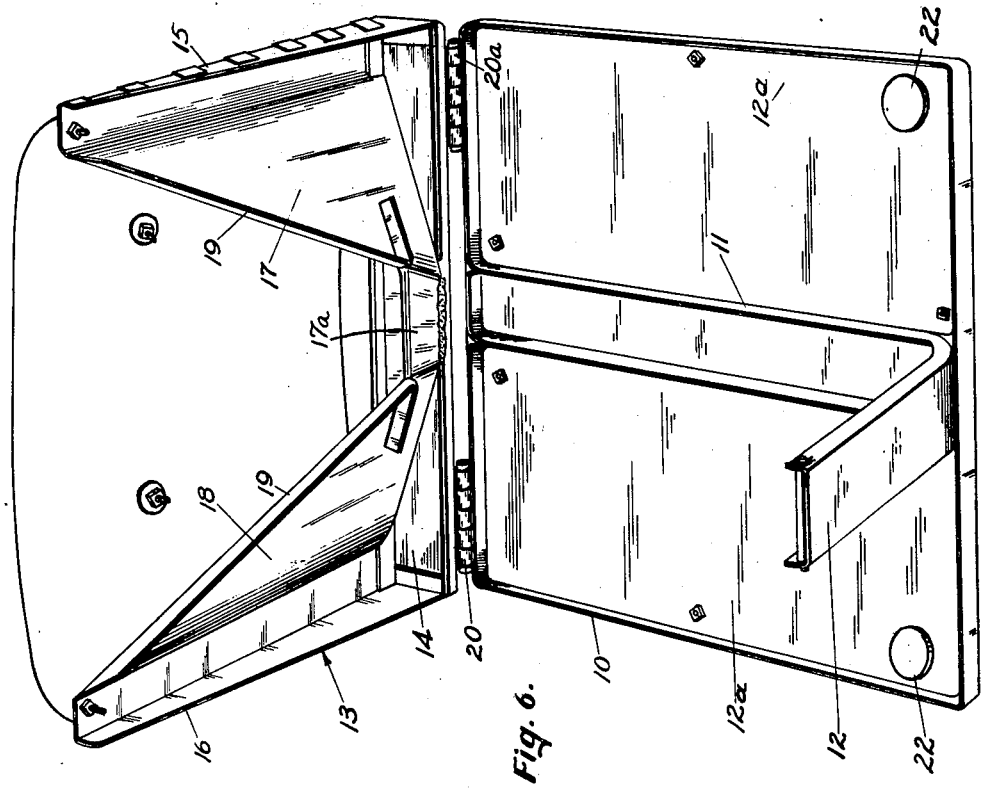
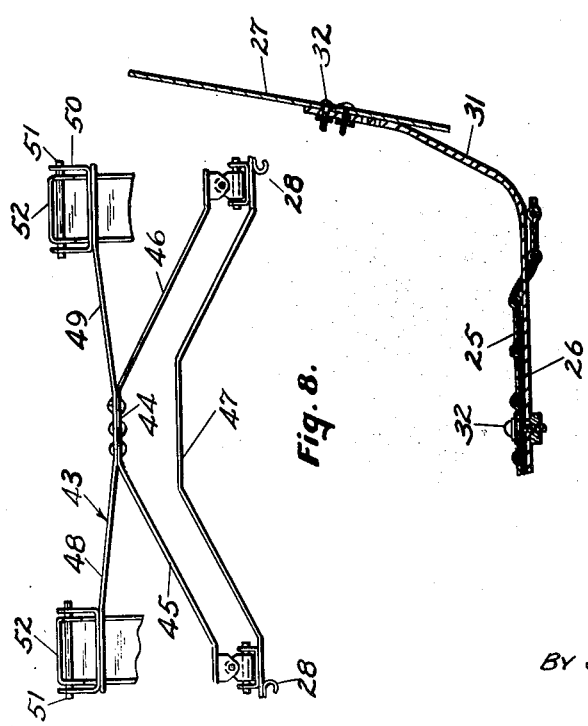
INVENTOR:
Hyland C. Flint
BY Thiess Olson & Mecklenburger
ATTYS:

Patented July 8, 1952

2,602,487

UNITED STATES PATENT OFFICE 2,602,487

SPRING SEAT AND BACK

Hyland C. Flint, Akron, Ohio

Application July 6, 1946, Serial No. 681,694

12 Claims. (Cl. 155—53)

The present invention relates to seat constructions and has special reference to seats of the unison type wherein movement of the back rest and the resilient substantially horizontally extending seat portion is synchronized to effect a somewhat floating support for the user.

Seat constructions embodying the present invention are capable of wide application, but are particularly intended for use in automotive vehicles, such as trucks, tractors, tanks and automobiles which may be subjected to hard rough usage.

The present seat may include a fixed support for being attached to a vehicle upon which the rest of the construction is mounted. A seat cushion frame is positioned on the support and connected thereto by means that permit at least the rear of the seat portion, where the weight of the user is largely concentrated, to move vertically while preventing horizontal movement of the frame with respect to said support.

The seat cushion frame is provided with means for resiliently supporting a person. Such means are preferably yielding strips comprising wires having substantially horizontally extending undulations with the strips being normally upwardly arched. These strips are advantageously arranged to extend from side to side crosswise of the seat portion as sidesway or motion is thereby substantially eliminated, there being relatively little give longitudinally of said strips. It is also advantageous to connect the yielding strips together into a unitary structure such as by means of flexible fabric sheets arranged on opposite sides of the strips and secured together between the strips by adhesive on the opposed faces thereof. The sides of the fabric sheets may be fixed with respect to the adjacent rearwardly extending sides of the seat frame to further enhance the stability of the seat portion.

A substantially vertically extending back rest frame is arranged for connection to the resilient seat portion adjacent the area or areas of greatest vertical movement thereof when in use so that as the resilient means to which the back rest is connected move vertically the back rest will similarly move vertically therewith. The weight of a person when sitting is particularly concentrated at the posterior protuberance of each pelvis (tuberosities of the ischia). Consequently, a greater downward pressure or movement of a resilient seat portion occurs below and adjacent these points which are located a couple of inches on each side of the base of the spine and a few inches forwardly thereof when the body is in a sitting position. In the preferred embodiment of the invention a transverse yielding strip is positioned to be subjected to the maximum vertical movement when in use and the means connecting the back rest frame to the seat portion are secured to this strip intermediate or adjacent the areas of greatest vertical movement.

A fixed upright comprising one or more members may extend upwardly from the rigid frame adjacent the rear of the seat construction. Means are arranged between the upright and the back rest frame for permitting vertical movement of the back rest frame with respect to the fixed upright or support while substantially preventing rearward movement and sidesway or sidewise movement thereof with the result that the seat is very stable at all times.

To insure maximum comfort to the user the seat construction is provided with a double springing action resulting in a relatively smooth riding effect over the roughest terrain. In addition to the yielding strips or other resilient means employed in the seat portion, at least the rear of the seat frame may be supported by additional springs or other resilient means. Such arrangement greatly reduces bouncing and rebound of the seat as the two resilient means being different in character, action and results, cooperate to produce a smooth floating effect. Moreover, seat frame supporting springs or resilient means of different strengths or resistances to load may be employed and readily interchanged to compensate for variations in the weight of the persons using the seat.

A seat of this character greatly reduces fatigue of or injury to the users which in the past have created a very serious problem, particularly in vehicles driven long distances or over rough terrain. With the present invention the back rest may be positioned and shaped to fit properly the back of the user and will remain substantially fixed with respect thereto irrespective of the movement of the vehicle.

The present seat is not only of simple construction and relatively light, but is very compact, requiring little, if any more, space than the usual type of seat. This is due in part to the use of the novel means arranged between the back rest frame and the fixed upright and the employment of a seat cushion frame which is substantially open at the rear, permitting maximum vertical depression of both the resilient means in the seat frame and the seat frame itself without engagement with any other fixed part. While the present seat results in a very smooth floating effect, it is substantially as stable as seats of usual rigid construction throughout.

An object of this invention is to provide a seat construction of the unison type having means permitting vertical movement of the back rest responsive to movement of the resilient seat portion while substantially preventing sidesway or sidewise movement of the seat.

Another object of the present invention is to provide a seat construction of the unison type in which the back rest frame is connected to the seat portion adjacent the area of greatest vertical movement of the latter when in use.

A further object of the present invention is to provide a seat construction of the unison type in which a seat cushion frame is mounted on a fixed support by means permitting vertical movement of at least the central and rear portions thereof while substantially preventing any horizontal movement with respect to said fixed support.

Another object is to provide a unison type seat construction in which the yielding strips in the seat portion extend transversely and the back rest frame is connected to a transverse yielding strip positioned for maximum vertical movement when the seat is in use.

A still further object is to provide a seat construction of the general type referred to above, having a double springing action for producing a smooth floating support for the user.

An additional object of the present invention is to provide a seat construction as above indicated, which is very compact and of relatively light, simple construction.

Further objects and advantages will be apparent from the following description and claims when considered with the accompanying drawings in which latter:

Fig. 3 is a side elevational view of the seat shown in Fig. 2 with a portion of the back rest broken away;

Fig. 4 is a front elevational view of the seat illustrated in Fig. 2;

Fig. 5 is a partial plan view of the means connecting the back rest frame to the fixed upright;

Fig. 6 is a perspective view of the rigid support and fixed upright with the seat cushion frame pivotally connected to the front thereof, the two parts being in open position;

Fig. 7 is a cross sectional view taken along the lines 7—7 of Fig. 2; and

Fig. 8 is a plan view of a modified form of means for connecting the back rest frame to a fixed upright comprising two upright members.

Figure 1:
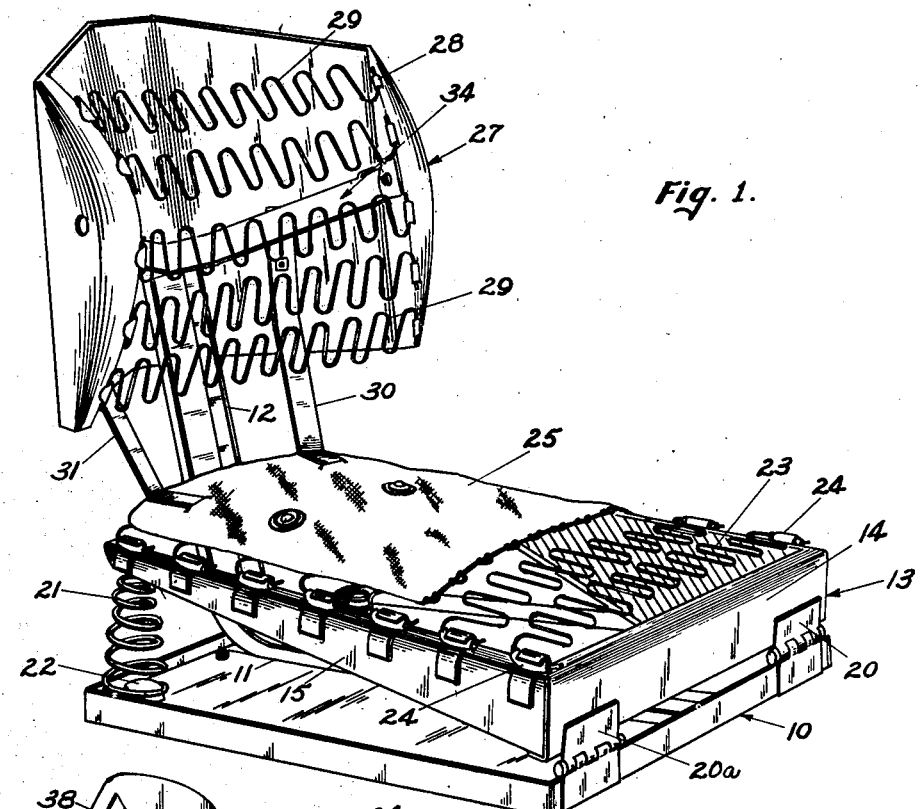
Fig. 1 is a perspective view of a seat construction embodying the present invention with the padding and cover removed.
Figure 2:
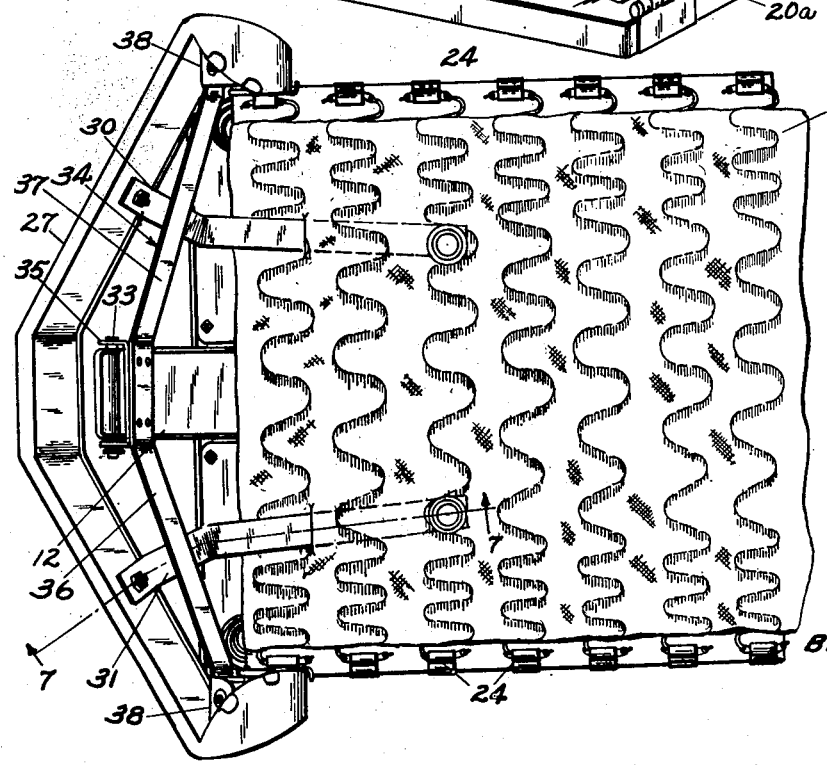
Fig. 2 is a top plan view of the seat shown in Fig. 1 with the back rest springs omitted.

Referring more particularly to the drawings there is shown a seat construction embodying the present invention. The seat may comprise a rectangular base 10, formed of angle iron. Extending from the front to the rear and substantially bisecting the angle iron frame 10 is a member 11 bent upwardly at the rear of the base 10 to form a substantially vertically extending upright 12. The bisecting member 11 and upright 12 may be formed of channel iron. Mounted in the base 10 on each side of the channel iron 11 are wooden floor members 12a to act as tacking strips for the upholstering of the seat if it is desired to extend the upholstering all the way to the base 10 of the seat.

A preferably three-sided seat frame 13 is mounted on the base 10. As shown particularly in Figs. 1 and 6, the frame 13 comprises a front portion or side 14 and two rearwardly extending sides 15 and 16. These side members are preferably in the form of angle irons with the vertical webs thereof decreasing in width from the front ends where they are substantially the same width as the front 14 to the rear free ends thereof. The horizontal webs of the side angle irons 15 and 16 are at the top thereof and extend inwardly toward each other as appears particularly in Fig. 6 of the drawings. Strengthening flanges 17 and 18 integral with or connected to the horizontal webs of the side members 15 and 16 extend inwardly and downwardly from the horizontal webs of the side members and increase in width from adjacent the free ends of the side members to the front portion thereof adjacent the front member 14. The forward ends of the flanges 17 and 18 are connected together by a connecting portion 17a which merges into the bottom edge of the front frame member 14. A downwardly extending flange 19 may be provided at the inner edges of the strengthening flanges. The space between the flanges 17 and 18 may be in the shape of a V as shown, or may be of any other suitable shape which will provide the requisite strength and will permit free vertical movement of the seat springs without any interference.

The seat frame may be connected to the front of the base 10 by means of hinges 20 and 20a which permit vertical movement of the rear of the seat frame when the same is in position for use while preventing substantially all horizontal movement of the seat frame with respect to its base. The rear of the frame is supported by resilient means, such as coil springs 21, these being positioned by projections 22 on the wooden floor 12. If desired, resilient means may also be employed for supporting the front end of the seat frame instead of the hinges 20. The seat frame is preferably arranged so that when the seat is not in use the rear end of the seat frame will be above the front end while when in use the seat frame will be substantially horizontal.

In order to provide a soft weight-supporting seat portion for the seat, resilient means are mounted on the frame 13. While various types of resilient means may be employed, yielding strips 23 of the type disclosed in Kaden Patent No. 2,002,399, dated May 21, 1935, are preferably employed. These yielding strips comprise a wire of circular cross section having substantially horizontally extending undulations. During manufacture of these yielding strips the wire undulations are given a permanent arcuate set of comparatively small radius. Clips 24 are mounted on the top of the two sides of the frame 13 and the ends of the yielding strips 23 are secured thereto with the strips extending in a substantially horizontal plane transversely of the frame 13. When the yielding strips are mounted for use between the clips 24, the normally small radius of the strips is enlarged to conform to the desired arch of the seat, and when a weight is disposed on the yielding strips a further enlargement of the radius is obtained which is resisted by the small radius of set. Instead of yielding strips, other resilient means, such as coil springs, may be used to provide the desired resiliency of the seat portion.

By arranging the yielding strips 23 so that they extend transversely of the seat, sidesway of the resilient members is substantially eliminated due to the resistance of the yielding strips to linear extension or contraction.

Arranged on each side of the yielding strips 23 are flexible fabric sheets 25 and 26. These sheets are preferably provided with adhesive on their opposed faces so that after being positioned on opposite sides of the yielding strips the portions intermediate the strips may be secured together and there is formed a resilient unitary weight-supporting structure comprising the yielding strips and the flexible fabric sheets 25 and 26, as shown particularly in Fig. 7. The fabric strips tend to prevent sidesway or other horizontal movement of the yielding strips and also tend to equalize the actions of the strips in resisting the weight of a person by distributing the load thereon. Although the rearwardly extending sides of the flexible sheets 25 and 26 are not secured to the sides of seat frame, they are fixed with respect thereto through the ends of the yielding strips which extend beyond the sides of the fabric sheets. While it is preferable to have the yielding strips running transversely of the seat frame 13, a different type of frame may be employed and the yielding strips mounted thereon so as to run from front to back. In such case the use of the fabric sheets is of even greater benefit in preventing sidesway of the yielding strips.

The transversely extending yielding strips are so positioned that when the seat is being used one strip will be subjected to the greatest concentration of weight and to the greatest vertical movement. The weight of a person when sitting is largely concentrated below the tuberosities of the two ischia, these being posterior protuberances of the pelvis generally a couple of inches on each side of the spine and forwardly thereof when the body is in a sitting position. Consequently, one of the yielding strips is arranged so that it will be substantially beneath these posterior protuberances of the user of the seat. Due to the normal action of the yielding strip the greatest vertical movement thereof will be between these two points of greatest weight concentration as the yielding strip assumes a slight downwardly arched shape therebetween.

With a seat portion, as above described, a very smooth ride will result even when the vehicle in which the seat is mounted passes over extremely rough terrain. This is due to the resiliency of the weight-supporting seat portion formed by the yielding strips 23 and the flexible fabric sheets 25 and 26, particularly when the seat frame is also resiliently supported. This double springing greatly reduces bouncing and rebound of the seat as the two suspension means, being different in character, action and results, cooperate to produce a smooth floating effect.

A back rest is employed with the present seat comprising a suitable back rest frame or portion 27 having clips 28 on the opposite sides thereof, between which are arranged yielding strips 29. The back rest is movably connected to fixed upright structure, such for example as the upright 12, so as to be vertically movable with respect thereto and is connected to the resilient weight-supporting seat portion so as to be vertically movable therewith. Arms 30 and 31 are employed for connecting the back rest portion to the seat portion. Each arm has a substantially vertically extending portion fixedly connected to the back rest by suitable means, such as by a nut and bolt and a substantially horizontally extending portion connected to the yielding strip subjected to the greatest weight concentration preferably under one of the two points of greatest load concentration of a person sitting thereon, this also being adjacent the portion of greatest vertical movement. The horizontally extending portion of the arm may be connected to the yielding strip by any suitable means, such as a bolt 32 (Fig. 7), which passes through the fabric sheets 25 and 26 between portions of the resilient strip and through washers arranged on the outer sides of the sheets 25 and 26, being properly held in place by means of a nut.

In order to prevent a pivotal movement of the arms 30 and 31 about their points of connection with the yielding strip the horizontal portion of the arms is preferably arranged as shown in Fig. 7, lying over the rearmost yielding strip and under the adjacent strips. As the seat frame is open at the rear there is no interference with the horizontal portions of the arms 30 and 31. With this means of connection between the back rest portion and the yielding strips the back rest will move vertically substantially the same amount as the yielding strip subjected to the greatest vertical movement and therefore will move vertically with the user of the seat.

The means for connecting back rest portion 27 to the fixed upright comprising the vertical portion of the channel iron 12 will now be described. Extending between the opposed flanges of the upright 12 is a pin or pivot member 33 mounted so as to lie in a horizontal plane transversely of the seat. The connecting member 34 may be provided adjacent the central portion thereof with a U-shaped bracket 35 which fits over the channel iron 12 and is pivoted to the two ends of the pin 33. Secured to or integral with the U-shaped member 35 are a pair of outwardly extending arms 36 and 37 connected to opposite sides of the back rest portion or frame 27 by a pivotal or universal connection such as shown particularly in Fig. 5. The arms 36 and 37, which may be rigid or have slight flexibility, preferably extend forwardly from the center portion of the connecting member 34 so that the point of connection of the arms 36 and 37 to the back rest portion 27 is a distance forwardly of the pivot 33. The outer end of each of the arms 36 and 37 is bent so as to substantially parallel the central portion of the connecting member and the pivot 33 and is provided with a U-shaped bracket 38. A pin 39 substantially at right angles to the pivot 33 extends through the opposed sides of each bracket 38. Pivotally connected to the pins 39 are universal connecting elements 40 having holes therethrough for loosely receiving the pins 39. The elements 40, which may be in the form of solid blocks, lie between the sides of the U-shaped brackets 38 and are also provided with horizontal bores for receiving pivot pins 41 carried by a bracket 42 on the back portion 27. There is thus provided a universal connection between the arms 36 and 37 and the back rest portion 27. Some play between the connecting elements 40 and the sides of the bracket 42 may be provided for to compensate for outward movement of the U-shaped brackets 38 upon any rearward movement thereof. As the arms 36 and 37 extend outwardly in opposite directions from the center portion of the connecting member 34 they act as braces to opposite sides of the back rest portion for preventing sidesway, while at the same time permitting vertical movement thereof resulting from vertical movement of the yielding strips and the user of the seat.

The fixed upright structure, which in Figs. 1 through 7 is shown as being a single upright element 12 located at the central rear of the seat, may comprise a pair of upright elements at the rear of the seat. In such a construction connecting means 43 shown in Fig. 8 may be employed. Similarly to the connecting member 34 of Fig. 5 the connecting member 43 has a central portion 44 with arms 45 and 46 extending outwardly therefrom connected by pivotal or universal connections to the back rest portion 47. The connection between the ends of the arms 45 and 46 and the back rest portion is the same as that previously described in connection with the construction illustrated in Fig. 5. Extending outwardly from the central portion 44 and, if desired, slightly rearwardly thereof are another pair of arms 48 and 49 provided at the ends thereof with U-shaped brackets 50 for connection with the pivot pins 51 mounted in the channel iron upright members 52.

The seat portion is provided with the usual resilient pad and outer cover which may be of any suitable material. Likewise, the yielding strips 29 of the back rest are covered by a resilient pad and an outer covering of material, such as leather, fabrics, etc.

The above described construction results in a relatively light, compact seat of simple construction. The use of the coil springs for supporting the seat frame in addition to the yielding strips, together with the back rest portion movable vertically with the yielding strips of the seat portion, results in a very smooth substantially floating ride for the user thereof, even when the vehicle in which the seat is mounted passes over rough terrain. Moreover, the seat is very stable, there being little or no sidesway of either the weight-supporting seat portion or the back rest portion. Consequently, such a seat greatly reduces fatigue and any possible injury to the user thereof.

While a preferred embodiment of the present invention has been shown and described, it is to be understood that various modifications may be made therein without departing from the scope and spirit of the present invention and therefore I wish to be limited only by the prior art and the appended claims.

I claim:

1. In a seat construction, a seat frame for being mounted on a fixed support, resilient means carried by said seat frame forming a weight-supporting seat portion, means for resiliently supporting at least the rear of said frame, means for substantially preventing sidesway of said frame with respect to said fixed support, a back rest portion connected to said first resilient means and movable vertically therewith, fixed upright structure adjacent the rear of said seat portion and means pivotally connecting said back rest portion to said fixed upright for permitting substantially vertical movement of said back rest portion, said pivotal connecting means having arms extending laterally outwardly from the sides thereof for substantially preventing sideways movement of the back rest portion with respect to said fixed support.

2. In a seat construction, a seat frame, a plurality of substantially horizontally arranged yielding strips secured to and extending between the rearwardly extending sides of said frame forming a weight-supporting seat portion, one of said strips being so positioned that the central portion thereof is subjected to the greatest weight concentration and the greatest vertical movement in use, a back rest portion and means connecting said back rest portion to said yielding strip whereby said back rest portion moves vertically with said strip, said means comprising a plurality of arms extending from said back rest portion intermediate said sides of said seat frame and being connected to said yielding strip subject to the greatest weight concentration adjacent the portion of greatest vertical movement, said arms overlying at least the rearmost yielding strip and underlying at least the adjacent strip.

3. In a seat construction, a seat frame, a plurality of substantially horizontally arranged spaced yielding strips secured to and extending between opposite sides of said frame, flexible fabric members arranged on opposite sides of said yielding strips and secured together between portions thereof to form a resilient unitary weight-supporting structure, the opposite edges of said fabric members being substantially laterally fixed with respect to the adjacent rearwardly extending seat frame sides, a back rest portion, and means connecting said back rest portion to said resilient unitary structure whereby said back rest moves vertically therewith, said means comprising an arm extending from said back rest portion and being secured to said resilient unitary structure adjacent the portion of greatest vertical movement thereof in use.

4. In a seat construction, a seat frame, a plurality of substantially horizontally arranged spaced yielding strips extending between opposite sides of said frame, at least some of said yielding strips being secured between the rearwardly extending sides of said seat frame, flexible fabric members arranged on opposite sides of said yielding strips and secured together between portions thereof to form a resilient unitary weight-supporting structure, the opposite edges of said fabric members being substantially laterally fixed with respect to the adjacent rearwardly extending seat frame sides, a back rest portion, and means connecting said back rest portion to said resilient unitary structure whereby said back rest moves vertically therewith, said means comprising an arm extending forwardly from said back rest portion and being secured to said resilient unitary structure adjacent the portion of greatest vertical movement thereof in use.

5. In a seat construction, a seat frame, a plurality of substantially horizontally arranged spaced yielding strips extending between opposite sides of said frame, at least some of said yielding strips secured between the rearwardly extending sides of said seat frame, flexible fabric members arranged on opposite sides of said yielding strips and secured together between portions thereof to form a resilient unitary weight-supporting structure, the opposite sides of said fabric members being substantially laterally fixed with respect to the adjacent rearwardly extending seat frame sides, a back rest portion, and means connecting said back rest portion to said resilient unitary structure whereby said back rest moves vertically therewith, said means comprising arms extending forwardly from said back rest portion below some of said yielding strips and intermediate the rearwardly extending sides of said seat frame and being connected to said resilient unitary structure adjacent the area of greatest vertical movement in use.

6. In a seat construction comprising resilient means forming a weight-supporting seat portion, a back rest portion connected to said resilient means and movable vertically therewith and fixed upright structure adjacent the rear of said seat portion, means movably connecting said back rest portion to said fixed support for permitting vertical movement of said back rest portion, said means having a central portion movably connected to said upright and an arm extending outwardly on each side of said central portion and connected to said back rest portion for preventing sideways motion thereof.

7. In a seat construction comprising resilient means forming a weight-supporting seat portion, a back rest portion connected to said resilient means and movable vertically therewith and a fixed upright adjacent the rear of said seat portion, means movably connecting said back rest portion to said fixed upright, said means being pivotally connected to said fixed upright for movement about a horizontal axis while prevented from sideways movement, and said means having a central portion with an arm extending outwardly to each side thereof and connected to said back rest portion.

8. In a seat construction comprising resilient means forming a weight-supporting seat portion, a back rest portion connected to said resilient means and movable vertically therewith and fixed upright structure comprising a single member adjacent the rear central portion of said seat portion, means movably connecting said back rest portion to said fixed upright, said means comprising a central portion with an arm extending outwardly on each side, a pivotal connection between said fixed upright and said central portion for permitting movement about a horizontal axis of said central portion and preventing sideways movement thereof, and said arms extending from said central portion and being pivotally connected to said back rest portion on each side thereof about a horizontal axis.

9. In a seat construction comprising resilient means forming a weight-supporting seat portion, a back rest portion connected to said resilient means and movable vertically therewith and fixed upright structure comprising a pair of upright members adjacent the rear of said seat portion, means movably connecting said back rest portion to said fixed upright structure, said means being pivotally connected to said upright members for movement about a horizontal axis and having a central portion with an arm extending outwardly on opposite sides of said central portion, said arms being pivotally connected to said back rest portion about a horizontal axis.

10. In a seat construction comprising resilient means forming a weight-supporting seat portion, a back rest portion connected to said resilient means and movable vertically therewith and fixed upright structure at the rear of said seat, means movably connecting said back rest portion to said upright structure comprising a connecting member pivotally mounted on said upright structure for vertical movement about a substantially horizontal axis, said member having diverging arms movably connected to said back rest portion for preventing sideways motion while permitting vertical movement thereof.

11. In a seat construction comprising resilient means forming a weight-supporting seat portion, a back rest portion connected to said resilient means and movable vertically therewith and fixed upright structure at the rear of said seat, means movably connecting said back rest portion to said upright structure comprising a connecting member pivotally mounted on said structure for vertical movement about a substantially horizontal axis, said member having diverging arms universally connected to said back rest portion for preventing sideways motion while permitting vertical movement thereof.

12. A seat construction comprising resilient means forming a weight-supporting seat portion, a back rest member connected to said resilient means and movable vertically therewith, said back rest member having a central portion with the side portions thereof projecting forwardly of the central portion, a fixed upright to the front of and adjacent said central portion, and a connecting member pivotally mounted on said upright member for vertical movement and having diverging arms movably connected to said forwardly projecting side portions for permitting vertical movement of said back rest while substantially preventing sideways movement thereof.

HYLAND C. FLINT.

REFERENCES CITED

The following references are of record in the file of this patent:

UNITED STATES PATENTS

| Number | Name | Date |
|---|---|---|
| 1,263,703 | Rilling | Apr. 23, 1918 |
| 1,441,534 | McCallough | Jan. 9, 1923 |
| 1,522,621 | Gibbs | Jan. 13, 1925 |
| 1,562,658 | Presly | Nov. 24, 1925 |
| 1,722,543 | Selje | July 30, 1929 |
| 1,928,939 | Larsen | Oct. 3, 1933 |
| 2,063,780 | Ball | Dec. 8, 1936 |
| 2,123,888 | Freund | July 19, 1938 |
| 2,142,358 | Kaiser | Jan. 3, 1939 |
| 2,235,878 | Haberstump | Mar. 25, 1941 |
| 2,241,551 | Hopkes | May 13, 1941 |
| 2,324,152 | Haberstump | July 13, 1943 |

FOREIGN PATENTS

| Number | Country | Date |
|---|---|---|
| 421,617 | Great Britain | Dec. 27, 1934 |